(12) United States Patent
Pearson et al.

(10) Patent No.: US 12,174,733 B2
(45) Date of Patent: *Dec. 24, 2024

(54) MUTATION TESTING IN PARALLEL THREADS

(71) Applicant: State Farm Mutual Automobile Insurance Company, Bloomington, IL (US)

(72) Inventors: Andrew L Pearson, Normal, IL (US); Nate Shepherd, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,756

(22) Filed: Sep. 13, 2023

(65) Prior Publication Data

US 2023/0418733 A1    Dec. 28, 2023

Related U.S. Application Data (63) Continuation of application No. 17/486,682, filed on Sep. 27, 2021, now Pat. No. 11,797,429, which is a continuation of application No. 17/224,873, filed on Apr. 7, 2021, now Pat. No. 11,163,675.

(51) Int. Cl.
  *G06F 11/36*  (2006.01)
  *G06F 8/30*   (2018.01)
  *G06F 8/41*   (2018.01)

(52) U.S. Cl.
  CPC ......... *G06F 11/3688* (2013.01); *G06F 8/30* (2013.01); *G06F 8/44* (2013.01); *G06F 11/3676* (2013.01); *G06F 11/3692* (2013.01)

(58) Field of Classification Search
  CPC ......... G06F 11/3688; G06F 8/30; G06F 8/44; G06F 11/3676; G06F 11/3692
  See application file for complete search history.

(56) References Cited

U.S. PATENT DOCUMENTS

| | | |
|---|---|---|
| 6,101,580 A | 8/2000 | Agesen |
| 6,298,317 B1 | 10/2001 | Wiemann |
| 6,324,639 B1 | 11/2001 | Heishi et al. |

(Continued)

OTHER PUBLICATIONS

Pratyusha Madiraju, "Paraμ—A Partial and Higher-Order Mutation Tool with Concurrency Operators", Jul. 14, 2011, IEEE (Year: 2011).*

(Continued)

*Primary Examiner* — Wei Y Zhen
*Assistant Examiner* — Amir Soltanzadeh
(74) *Attorney, Agent, or Firm* — Lee & Hayes, P.C.

(57) ABSTRACT

Mutation testing can indicate whether mutants of a software application, created by intentionally altering source code of the software application, are successfully "killed" by test cases executed against the mutants. Mutation testing can be performed via parallel threads by, within each parallel thread, modifying individual source code class files and recompiling the modified class files to generate and test mutants. Individual mutation test results produced within each of the parallel threads can be aggregated to generate an aggregated test result report that indicates overall testing metrics associated with the mutation testing across the parallel threads.

20 Claims, 5 Drawing Sheets

(56) References Cited

U.S. PATENT DOCUMENTS

| | | | |
|---|---|---|---|
| 7,089,272 | B1 | 8/2006 | Garthwaite et al. |
| 9,430,194 | B1 | 8/2016 | Childs et al. |
| 10,007,515 | B2 | 6/2018 | Subramanian et al. |
| 10,387,295 | B1 | 8/2019 | Kesarwani |
| 10,949,172 | B1 | 3/2021 | Jain et al. |
| 11,163,675 | B1* | 11/2021 | Pearson .................. G06F 8/44 |
| 2003/0025722 | A1 | 2/2003 | Cliff et al. |
| 2003/0233614 | A1 | 12/2003 | Mohamed |
| 2005/0166094 | A1 | 7/2005 | Blackwell et al. |
| 2005/0188364 | A1 | 8/2005 | Cockx et al. |
| 2005/0240737 | A1 | 10/2005 | Holt |
| 2008/0109641 | A1 | 5/2008 | Ball et al. |
| 2008/0307006 | A1 | 12/2008 | Lee et al. |
| 2009/0307500 | A1 | 12/2009 | Sato et al. |
| 2010/0146490 | A1 | 6/2010 | Grosse et al. |
| 2010/0241827 | A1 | 9/2010 | Yu et al. |
| 2014/0157232 | A1 | 6/2014 | Li |
| 2015/0095894 | A1 | 4/2015 | Tripp |
| 2015/0100951 | A1 | 4/2015 | Raundahl Gregersen |
| 2015/0309914 | A1 | 10/2015 | Eddington et al. |
| 2015/0363175 | A1 | 12/2015 | Klausner |
| 2016/0048444 | A1 | 2/2016 | Crova et al. |
| 2016/0216962 | A1 | 7/2016 | Wang et al. |
| 2017/0012819 | A1 | 1/2017 | Raheja et al. |
| 2017/0068612 | A1 | 3/2017 | Herzig et al. |
| 2018/0074936 | A1 | 3/2018 | Broadbent et al. |
| 2018/0095869 | A1 | 4/2018 | Peer et al. |
| 2018/0232300 | A1 | 8/2018 | Cmielowski et al. |
| 2018/0321918 | A1 | 11/2018 | McClory et al. |
| 2018/0365139 | A1 | 12/2018 | Rajpal |
| 2019/0227786 | A1 | 7/2019 | Price et al. |
| 2020/0042882 | A1 | 2/2020 | Liu et al. |
| 2020/0073790 | A1 | 3/2020 | Abhishek |
| 2021/0096831 | A1 | 4/2021 | Satyarth |
| 2021/0141714 | A1* | 5/2021 | Lees .................. G06F 11/3409 |
| 2022/0206930 | A1* | 6/2022 | Bier .................... G06F 11/3688 |
| 2022/0327043 | A1 | 10/2022 | Pearson |
| 2022/0327045 | A1 | 10/2022 | Pearson |

OTHER PUBLICATIONS

Pedro Reales Mateo, "Mutation at the multi-class and system levels", ScienceDirect, Apr. 1, 2013, vol. 78, Issue 4, pp. 364-387 (Year: 2013).*

Auerbach et al., "Lime: a Java-Compatable and Synthesizable Language for Heterogeneous Architectures", IBM Research, 2010, pp. 89-108.

Elizono, et al., "Recent Patents of Computational Intelligence", Centre of Computational Intelligence, School of Computing, De Monfort University, 11 pgs.

Gligoric, et al., "Selective Mutation Testing for Concurrent Code", ISSTA, Jul. 2013, pp. 224-234.

Irvine, et al., "Jumble Java Byte Code to Measure the Effectiveness of Test Units", Testing: Academic and Industrial Conference—Practice and Research Techniques, Mar. 2007, pp. 169-175.

Kim, "Class Mutation: Mutation Testing for Object-Oriented Programs", 2000, 15 pgs.

Kim, et al., "Invasive Software Testing: Mutating Target Programs to Diversify Test Exploration for High Test Coverage", IEEE, 2018, pp. 239-249.

Lochab, "Analysis of Mutation Tools in Aspect Oriented Software Engineering", 2013, 10 pgs.

Office Action for U.S. Appl. No. 17/224,873, mailed on Jun. 16, 2021, Pearson, "Mutation Testing in Parallel Threads", 23 Pages.

Office Action for U.S. Appl. No. 17/224,904, mailed on Jun. 25, 2021, Pearson, "Mutation Testing Within Continuous Integration Systems", 23 Pages.

Office Action for U.S. Appl. No. 17/224,904, mailed Jan. 25, 2022, Pearson, "Mutation Testing Within Continuous Integration Systems ", 30 pages.

Office Action for U.S. Appl. No. 17/486,682, mailed on Oct. 21, 2022 Pearson, "Mutation Testing in Parallel Threads", 27 Pages.

Office Action for U.S. Appl. No. 17/558,279, mailed on Oct. 25, 2022, Pearson, "Runtime Class Recompilation During Mutation Testing", 18 Pages.

Office Action for U.S. Appl. No. 17/486,682, mailed on Feb. 17, 2023, Pearson, "Mutation Testing in Parallel Threads", 31 Pages.

Office Action for U.S. Appl. No. 17/224,904, mailed on May 26, 2022, Pearson, "Mutation Testing Within Continuous Integration Systems ", 32 pages.

Office Action for U.S. Appl. No. 17/225,027, mailed on Jun. 14, 2021, Pearson, "Runtime Class Recompilation During Mutation Testing" 18 pages.

Office Action for U.S. Appl. No. 17/224,904, mailed on Sep. 7, 2021, Pearson, "Mutation Testing Within Continuous Integration Systems ", 26 pages.

Park, et al., "Fuzzing JavaScript Engines with Aspect-preserving Mutation" 2020 IEEE Symposium on Security and Privacy, 2020, pp. 1628-1642.

Tufano et al., Learning How to Mutate Source Code from Bug-Fixes, IEEE Internation Conference on Software Maintenance and Evolution, 2019, 12 pages.

* cited by examiner

Mutation Test Summary Report:
- Test Started Date/Time: 04/01/2021 07:19:05 am CST
- Test Finished Date/Time: 04/01/2021 03:17:20 pm CST
- Test Duration: 7 hours 58 minutes 15 seconds
- Total Number of Mutations Identified: 5339
- Number of Mutants Run: 1775
- Number of Mutants Killed: 1614
- Overall Percentage of Mutants Killed: 91%
- Percent of Available Mutants Run: 33%

304

| Class Name 306 | Unit Test Line Coverage 308 | Mutant Count 310 | % Mutants Killed 312 |
|---|---|---|---|
| class1.gs | 100 | 0 | 0 |
| class2.gs | 100 | 1 | 100 |
| class3.gs | 0 | 0 | 0 |
| class4.gs | 25 | 17 | 0 |
| class5.gs | 93 | 4 | 50 |
| class6.gs | 100 | 10 | 90 |
| ... | ... | ... | ... |

```
...    ...
23     if (customerDetails == null) {
24        return true
25     }
26     return false                    Mutant survived at index 24 != for ==
26   }),
                    402
...    ...
31     if (accountContactClientID == null) {
32        return true
33     }
34     return customerDetailsClientID != accountContactClientID
35   }),
...    ...
```

MUTATION TESTING IN PARALLEL THREADS

PRIORITY

This application is a continuation of, and claims priority to, U.S. patent application Ser. No. 17/486,682, filed on Sep. 27, 2021, which is a continuation of U.S. patent application Ser. No. 17/224,873, filed on Apr. 7, 2021, entitled "MUTATION TESTING IN PARALLEL THREADS," now known as U.S. Pat. No. 11,163,675, issued on Nov. 2, 2021, each of which is fully incorporated by reference herein.

TECHNICAL FIELD

The present disclosure relates to software testing, particularly with respect to mutation testing different application mutants concurrently in different parallel threads.

BACKGROUND

During development of a software application, software developers can prepare test cases to verify that the software application operates as expected. Such test cases may be associated with unit testing that tests the functionality of a relatively small piece of code, and/or integration testing that tests how multiple pieces of code interact. Because individual test cases may be designed to test one or more relatively small aspects of the overall software application, software developers may create numerous tests associated with the entire software application.

Software developers may also perform mutation testing to verify that a suite of test cases adequately tests the software application. Mutation testing may involve making a small code change to create an application mutant that includes an intentional error or fault. For example, an application mutant can be created in part by changing an "and" logical operator in a line of code to an "or" logical operator. The suite of test cases can then be executed against the application mutant. If test cases fail due to the code change, the application mutant is considered to be "killed." This may indicate that the suite of test cases has been properly designed to detect errors in the software application. However, if test cases succeed despite the code changes that introduced faults into the application mutant, such that the application mutant is not "killed," the success of the test cases may indicate that the suite of test cases has not been designed to fully test errors in the software application. For instance, the suite of test cases may include tests cases that are not actually testing what they are intended to test, and/or may not include test cases that test for errors or situations corresponding to the faults that were introduced into the application mutant. In some examples, a quality level of a suite of test cases can be determined based on a percentage of application mutants that the suite of test cases kill.

Some tools have been developed that can automatically perform mutation testing by creating application mutants and executing a suite of test cases against the application mutants. However, many such tools rely on initially compiling source code for the software application into bytecode that can be executed by a virtual machine, and then editing lines of the compiled bytecode to create the application mutants. For example, some Java® testing tools are configured to compile Java® source code class files into corresponding Java® bytecode class files, and then edit lines of the already-compiled Java® bytecode class files in various ways to create different application mutants. Accordingly, such tools can create and test application mutants based on changes to already-compiled bytecode that is directly executable by a virtual machine.

However, such existing testing tools and mutation testing approaches may be inefficient and/or impractical for some types of programming languages. For example, source code for a software application may be written in the Gosu® programming language. Similar to Java®, Gosu® source code class files can be compiled into Java® bytecode class files that can be directly executed by a virtual machine. However, unlike Java®, Gosu® compilers may generate multiple Java® bytecode class files from a single Gosu® source code class file. For instance, compiling one Gosu® source code class file may produce five corresponding Java® bytecode class files.

A set of multiple compiled Java® bytecode class files associated with a single Gosu® source code class file may include code that is fragmented and/or disassociated with the original structure of the Gosu® source code class file. Accordingly, it may be difficult or impossible to reconstruct the original Gosu® source code class file from a corresponding set of multiple compiled Java® bytecode class files. It may also be difficult or impossible to determine, after compilation, how a change to the source code class file affected code in multiple compiled Java® bytecode class files.

As noted above, existing mutation testing tools may be configured to generate an application mutant by making a code change to an already-compiled bytecode class file that corresponds to a change that could have been to a corresponding source code class file before compilation. However, because Gosu® compilers may produce multiple bytecode class files for each individual Gosu® source code class file, it may be difficult or impossible to identify changes to one or more of the multiple compiled bytecode class files that would have been equivalent to a small code change to the Gosu® source code class file before compilation. Therefore, it may also be difficult or impossible for existing mutation testing tools to determine which changes to make to bytecode class files to produce application mutants, after Gosu® source code class files have been compiled into the bytecode class files. Accordingly, existing mutation testing tools that rely on modifying bytecode may not be able to perform mutation testing associated with software applications written in Gosu® or other programming languages, such as the Scala programming language, in which compilers produce bytecode that has a different structure or number or class files than the original source code.

The example systems and methods described herein may be directed toward mitigating or overcoming one or more of the deficiencies described above.

SUMMARY

Described herein are systems and methods for executing mutation testing via multiple parallel threads. Mutation testing can indicate whether application mutants, created by altering source code of a software application, are successfully "killed" by test cases executed against the application mutants. Different parallel threads may modify individual source code class files, and recompile the modified class files to generate and test different application mutants. Accordingly, different application mutants can be tested concurrently in different parallel threads. The parallel threads can also produce individual mutation test results, which can be aggregated into an aggregated test result report that indicates overall testing metrics associated with the mutation testing across the parallel threads.

According to a first aspect, a computer-implemented method can include initiating, by one or more processors of one or more computing devices, a plurality of parallel threads. The method can also include identifying, by the one or more processors, and in different threads of the plurality of parallel threads, mutatable source code class files associated with a software application. The method can additionally include modifying, by the one or more processors, and in the different threads, the mutatable source code class files based on at least one mutation configuration. The method can further include compiling, by the one or more processors, and in the different threads, the mutatable source code class files into compiled bytecode. The method can also include executing, by the one or more processors, and in the different threads, a plurality of test cases against application mutants that include the compiled bytecode.

According to a second aspect, a computing device can include one or more processors and memory. The memory can store application source code, associated with a software application, comprising a plurality of class files. The memory can also store one or more mutation configurations. The memory can further store computer executable instructions associated with a mutation test manager that, when executed by the one or more processors, cause the one or more processors to perform operations. The operations can include initiating a plurality of threads, and distributing the plurality of class files among the plurality of parallel threads. The operations can also include identifying, in the plurality of parallel threads, mutatable class files, of the plurality of class files, based on the one or more mutation configurations. The operations can also include modifying, in the plurality of parallel threads, the mutatable class files based on the one or more mutation configurations. The operations can also include compiling, in the plurality of parallel threads, the mutatable class files into compiled bytecode, and executing, in the plurality of parallel threads, at least a portion of the plurality of test cases against a plurality of application mutants that include the compiled bytecode.

According to a third aspect, one or more non-transitory computer-readable media can store computer-executable instructions that, when executed by one or more processors, cause the one or more processors to initiate a first parallel thread and a second parallel threads, and to perform, substantially concurrently, first parallel thread operations associated with the first parallel thread and second parallel thread operations associated with the second parallel thread. The first parallel thread operations can include identifying a first mutatable source code class file associated with a software application, modifying the first mutatable source code class file based on at least one mutation configuration, compiling the first mutatable source code class file into one or more first compiled bytecode class files, and executing a plurality of test cases against a first application mutant that includes the one or more first compiled bytecode class files. The second parallel thread operations can include identifying a second mutatable source code class file associated with the software application, modifying the second mutatable source code class file based on the at least one mutation configuration, compiling the second mutatable source code class file into one or more second compiled bytecode class files, and executing the plurality of test cases against a second application mutant that includes the one or more second compiled bytecode class files.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
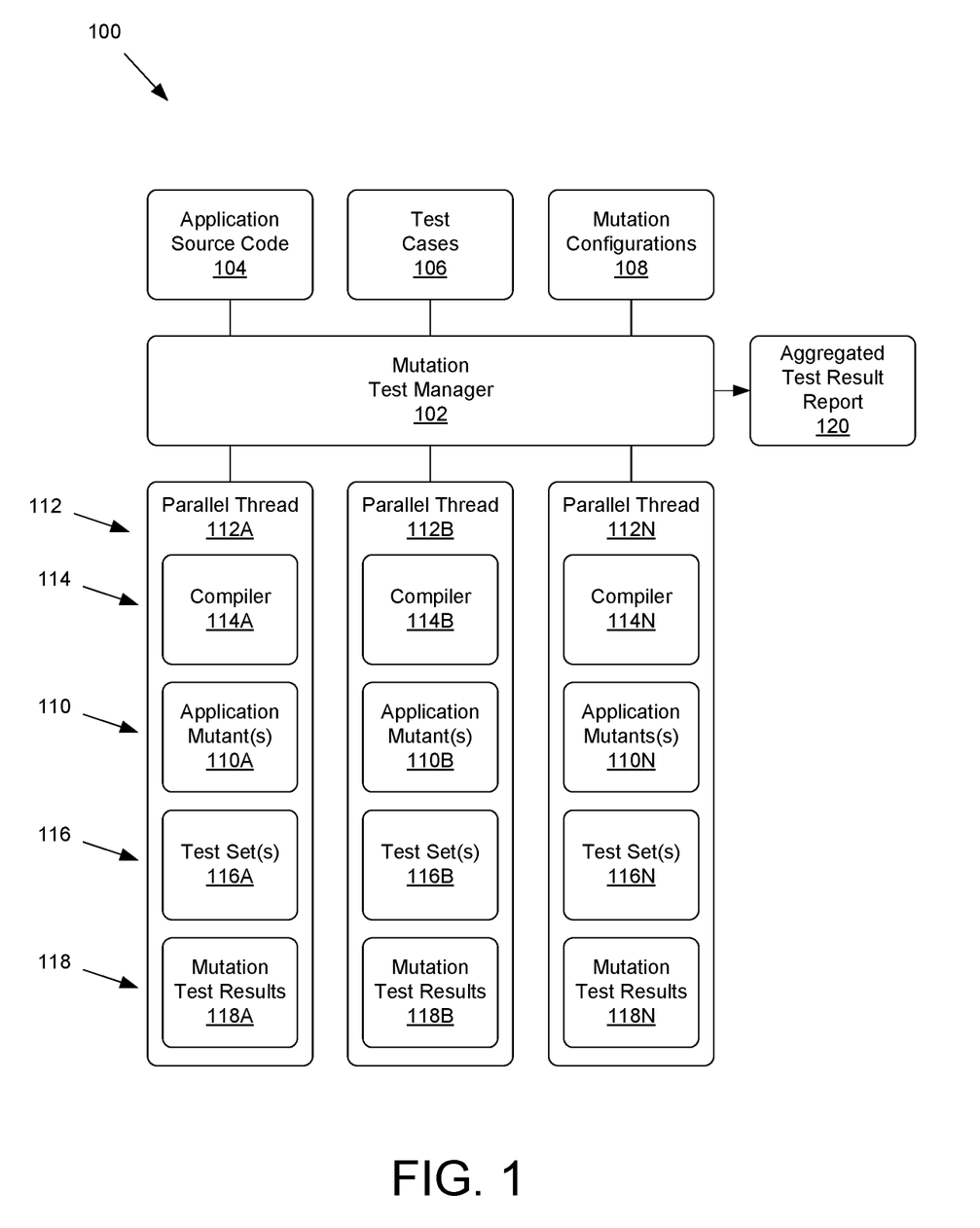
FIG. 1 shows an example of a software testing system configured to perform mutation testing associated with a software application.

FIG. 1 shows an example of a software testing system 100 configured to perform mutation testing associated with a software application. The software testing system 100 can include a mutation test manager 102 that has, and/or has access to, application source code 104 associated with the software application, test cases 106 associated with the software application, and mutation configurations 108 associated with the software application. The mutation test manager 102 can be configured to execute mutation testing associated with different application mutants 110 of the software application in different parallel threads 112 concurrently.

The mutation test manager 102 can include one or more executable software components, class files, scripts, or other elements that are configured to manage mutation testing in different parallel threads 112 based on the application source code 104, the test cases 106, and the mutation configurations 108. In some examples, the mutation test manager 102 may include multiple components that execute inside and/or outside of the parallel threads 112. For example, the mutation test manager 102 may include a class file or other component that executes within a container to initiate and/or manage parallel threads 112 on one or more computing devices, and may also include associated scripts, class files, or other components that can run within each of the parallel threads 112 to execute test cases 106 against application mutants 110.

The mutation test manager 102 can cause the application source code 104 to be compiled into bytecode for different application mutants 110, based on the mutation configurations 108. The mutation test manager 102 can also cause the compiled bytecode of the application mutants 110 to be executed by virtual machines via the parallel threads 112, such that the test cases 106 can be executed against the application mutants 110.

The application source code 104 can be source code for a software application, such as a software program comprising computer-executable instructions associated with one or more functions. As a non-limiting example, the software application can be an insurance policy management system that manages insurance policies by enabling creation, renewal, and/or termination of insurance policies associated with an insurance company, enabling users associated with the insurance company to view and/or edit information about insurance policies, and/or performing other tasks associated with management of insurance policies. In other examples, the software application can be a billing and payment system, a customer management system, an order tracking system, an electronic commerce system, a database management system, a website backend system, or any other type of software.

The application source code 104 can include lines of source code written in a programming language, such as the Gosu® programming language. The lines of source code can be arranged into classes and methods. For example, the application source code 104 can include a set of class files associated with classes. Each class file may include lines of source code, including source code for methods within classes. Methods can be functions, such as functions written in the Gosu® programming language. As an example, a class file can be a .gs file containing Gosu® source code for one or more methods. In some examples, different sets of one or more class files can be associated with different class file packages within the application source code 104.

The application source code 104 can be compiled into an executable and/or deployable file associated with the software application, such as a web application archive (WAR) file or a Java® archive (JAR) file. For example, a compiler may compile a set of Gosu® source code class files into Java® bytecode class files, and package the compiled Java® bytecode class files together into a single WAR file that can be read and/or executed by a Java® virtual machine.

In some examples, a compiler may produce multiple Java® bytecode class files from an individual Gosu® source code class file, such that the WAR file may include more compiled Java® bytecode class files than Gosu® source code class files in the application source code 104. In other examples, the application source code 104 can be written in any other programming language, such as the Scala programming language, for which compilation creates a different number of bytecode class files than source code class files, or otherwise produces bytecode that differs in structure from the application source code 104 such that there may or may not be a one-to-one relationship between classes in the application source code 104 and classes in corresponding compiled bytecode.

The test cases 106 can be configured to test the functionality of new or existing versions of the software application. For example, the test cases 106 can include unit tests written by one or more software developers for unit testing of the software application. In some examples, the test cases 106 may also, or alternately, include integration tests written by one or more software developers for integration testing of the software application. The test cases 106 can be designed to verify whether a new or existing version of the software application passes the set of test cases 106 and operates as intended by the software developers.

Similar to the application source code 104, test cases 106 may be written in the Gosu® programming language or another programming language, and may be arranged into classes and methods. Accordingly, the test cases 106 may also be expressed in class files, such as .gs files.

There may be a relatively large number of test cases 106, such as hundreds or thousands of individual test cases 106. The set of test cases 106 may include numerous unit tests and/or integration tests that developers have written to test numerous different aspects of the software application.

For example, if the software application executes in part in association with a database, various test cases 106 may test whether the software application can access the database, can access particular tables of the database, and/or can access particular records in the database. Other test cases 106 may test whether user input received by the software application is stored and/or processed correctly by the software application, whether the software application produces correct output based on test input data, whether the software application correctly interfaces with other applications and/or remote network elements, and/or any other functionality of the software application.

In some examples, some of the test cases 106 may also be based on regulatory requirements, state laws, business requirements, rules, and/or other factors. For instance, if the software application is a policy management system that manages insurance policies, different states or jurisdictions may have different laws that impact how such insurance policies are to be managed. Accordingly, the test cases 106 can include one set of tests that attempt to verify that the software application can successfully manage insurance policies according to the rules of one jurisdiction, as well as another set of tests that attempt to verify that the software application can also successfully manage insurance policies according to the rules of another jurisdiction.

In some examples, some of the test cases 106 may be designed to test functionality implemented based on lines of source code in specific class files of the application source code 104. Accordingly, in these examples, specific test cases 106 may correspond to specific source code class files of the application source code 104.

The mutation test manager 102 can be configured to manage mutation testing associated with the software application, for example to determine a quality level of the test cases 106. The mutation test manager 102 can use a set of mutation configurations 108 to determine changes to make to the application source code 104 during mutation testing. The mutation configurations 108 may indicate a set of mutation patterns that can be used to introduce faults into lines of source code in the application source code 104, so that when a WAR file or other executable version of the software application is compiled from the application source code 104, that executable version of the software application is a "mutant" version of the software application. Mutant versions of the software application are referred to as application mutants 110 herein. For example, the mutation configurations 108 may include various mutation patterns that swap, rearrange, or change variables in the application source code 104, change logical operators in the application source code 104, change data types of variables in the application source code 104, delete or insert logical operators in the application source code 104, delete, insert, or change statements in the application source code 104, replace variables with constants in the application source code 104, and/or edit the application source code 104 in any other way.

The mutation configurations 108 may be used to create a large number of application mutants 110, for instance by making the same types of changes, and/or different types of changes to different lines of code in the application source code 104. In some examples, each application mutant can be created based on a single change to a single class file in the application source code 104. For example, if the application source code 104 includes five hundred class files, and each of those class files could be changed in one hundred different ways based on the mutation configurations 108, there may be five thousand different application mutants 110 that could be produced during mutation testing.

The mutation test manager 102 can cause some or all of the test cases 106 to be executed against each of the application mutants 110. If test cases 106 fail due to a mutation introduced into the application source code 104 for an application mutant, the application mutant may be considered to have been "killed." If test cases 106 succeed despite the mutation introduced into the application source code 104 for the application mutant, the application mutant may be considered to have "survived."

For example, a test case designed to test that output produced by the software application is a positive value may fail if a line of the application source code 104 was modified, according to a mutation configuration, to instead produce negative values. In this example, the test case may be intentionally designed to fail if negative values are detected in the output. Accordingly, the failure of the test case may indicate that the test case successfully detected and "killed" the application mutant, and thus indicate that the test case operates as intended to detect errors in the software application. However, if the test case does not fail, despite mutated source code that causes the application mutant to produce negative output, the success of the test case and its inability to kill the application mutant may indicate that the test case is inadequate to sufficiently test the software application. Software developers may respond by altering the test case, or writing new test cases that may better test for negative output.

An overall quality level of the test cases 106 can be determined based on a number or percentage of different application mutants 110 that the test cases 106 "kill." For example, if the set of test cases 106 kill 95% of application mutants 110, the set of test cases 106 may be considered to have a relatively high quality. However, if the set of test cases 106 only kill 40% of application mutants 110, the set of test cases 106 may be considered to have a relatively poor quality, and software developers may attempt to revise the set of test cases 106 to kill a higher percentage of application mutants 110 and thereby detect a wider range of errors or other issues associated with the software application.

As discussed above, mutation testing may involve making a single change to a single class file in the application source code 104, compiling a corresponding application mutant, executing test cases 106 against that application mutant, and repeating this process for numerous application mutants 110. However, because the application source code 104 can include numerous class files, each of which could be mutated in many different ways, there may be a large number of possible application mutants that could be generated during mutation testing. Moreover, the mutation testing may involve executing some or all of the test cases 106 against each of those possible application mutants 110. Sequentially creating each of a large number of application mutants 110 by making source code changes, recompiling based on the changed source code, and then executing the test cases 106 against each application mutant may take a significant amount of time and/or computing resources.

For instance, it may be possible to generate thousands of possible application mutants 110 based on different changes to the same and/or different class files of the application source code 104. However, sequentially compiling thousands of different application mutants 110 based on different source code changes and also testing each compiled application mutant against hundreds or thousands of test cases 106 may require an extended period of time, and/or require significant processor cycles, memory, and other computing resources to be devoted to the mutation testing for the extended period of time.

However, the mutation test manager 102 can reduce mutation testing times, and/or reduce computing resource usage associated with mutation testing, by testing different application mutants 110 in different parallel threads 112 substantially concurrently. For example, the mutation test manager 102 can cause one or more computing devices and/or virtual machines to spin up a set of parallel threads 112, such as parallel threads 112A, 112B, . . . 112N, etc. shown in FIG. 1. The mutation test manager 102 can also cause one or more compilers 114, such as compilers 114A, 114B, . . . 114N, etc. associated with each of the parallel threads 112 as shown in FIG. 1, to generate application mutants 110 based on the mutation configurations 108. One of more application mutants 110, such as application mutants 110A, 110B, . . . 110N, etc. shown in FIG. 1, can thus be associated with each of the parallel threads 112. The mutation test manager 102 can further cause test sets 116, such as test sets 116A, 116B, . . . 116N, etc. shown in FIG. 1, to be executed against individual application mutants 110 in the different parallel threads 112. The test sets 116 may include some or all of the test cases 106. Accordingly, the same or different test sets 116 may be executed, substantially concurrently, against different application mutants 110 in different parallel threads 112.

The mutation test manager 102 may use virtual machines, hyperthreading, parallel threads, and/or any other type of parallelization to initialize multiple parallel threads 112, and execute test cases 106 against different application mutants 110 in different parallel threads 112 in parallel at substantially the same time. In particular, the mutation test manager 102 can spin up and use any number of parallel threads 112 on one or more computing devices, depending on the memory, processing power, and/or other computing resources available on the computing devices. For example, a computing device can be a server that has 128 GB of memory and 16 CPUs. In this example, if different instances of the software application historically use approximately 15 GB of memory when executed during mutation testing, the mutation test manager 102 may initialize eight parallel threads 112 that are each allocated 16 GB of memory on the server. The mutation test manager 102 can accordingly cause each of the eight parallel threads 112 to perform mutation testing associated with one or more different application mutants 110.

In some examples, the mutation test manager 102 may have, or be associated with, a resource manager (not shown). The resource manager may be configured to monitor the amount of computing resources associated with mutation testing via the parallel threads 112, and be configured to spin up or spin down the number of parallel threads 112 during the mutation testing based on usage levels associated with the computing resources. For example, to avoid overloading a computing device and slowing down processing associated with some or all of the parallel threads 122, the resource manager of the mutation test manager 102 may be configured to determine if processor usage and/or memory usage is above 70%, or another predefined threshold, of computing resources available on a computing device executing the parallel threads 112. If the resource manager determines that the parallel threads 112 are using more than the predefined threshold of computing resources, the resource manager may cause the mutation test manager 102 to lower the number of parallel threads 112 used during mutation testing. If the resource manager instead determines that that the parallel threads 112 are using less than the same, or a lower, predefined threshold of computing resources, the resource manager may indicate that the mutation test manager 102 can increase the number of parallel threads 112 used during mutation testing. Accordingly, the mutation test manager 102 may determine and/or dynamically adjust the number of parallel threads 112 used during the mutation testing described herein based on real-time and/or historical metrics of computing resource usage.

In some examples, the mutation test manager 102 may provide compilers 114 in each of the parallel threads 112 with the application source code 104. The mutation test manager 102 may also assign each parallel thread to perform mutation testing based on changes to one or more specific class files, or specific class file packages, in the application source code 104. The parallel threads may modify individual class files in different ways according to the mutation configurations 108, such that the compilers 114 can generate application mutants 110 based on modifications to class files.

For example, the compiler 114A may compile a set of unmodified source code class files, and one modified source code class file, into a new WAR file associated with an application mutant 110A. The WAR file associated with an application mutant 110A can be loaded into memory associated with parallel thread 112A, and a test set 116A that includes some or all of the test cases 106 can be executed against the application mutant 110A. The compiler 114A can later compile a second application mutant based on a different modification of the application source code 104, for instance by compiling a full set of source class files that includes a different modified class file into a new WAR file, such that the same or a different test set can be executed against the second application mutant in parallel thread 112A.

Different parallel threads 112B may compile and test a different set of application mutants 110, based on different mutations to class files of the application source code 104. The parallel threads 112 may perform operations substantially concurrently, such that different application mutants 110 can be tested substantially concurrently in different parallel threads 112. Testing application mutants 110 in the parallel threads 112 can accordingly reduce testing times, and/or usage of computing resources, relative to testing different application mutants 110 sequentially in a single thread. For example, if the mutation test manager 102 spins up ten parallel threads 112, a set of application mutants 110 can be processed approximately ten times more quickly than the set of application mutants 110 could be processed in a single thread.

In some examples, the mutation test manager 102 may implement parallel mutation testing at least in part by causing the compilers 114 to generate the application mutants 110 by recompiling single source code class files, instead of recompiling all of the source code class files of the application source code 104. In these examples, the mutation test manager 102 may provide an initial non-mutated version of the software application to each of the parallel threads 112, or cause the compilers 114 of each of the parallel threads 112 to compile the initial non-mutated version of the software application based on the application source code 104. The mutation test manager 102 can cause each of the parallel threads 112 to load an instance of the non-mutated version of the software application in memory.

For example, a compiler may compile a WAR file based on all of the source code class files, without modification, in the application source code 104. The mutation test manager 102 may provide copies of the compiled WAR file, representing an initial non-mutated version of the software application, to each of the parallel threads 112 for execution. Alternatively, the mutation test manager 102 may instruct each of the compilers 114 associated with each of the parallel threads 112 to compile a WAR file based on all of the source code class files, without modification, in the application source code 104. Each of the parallel threads 112 may accordingly load an initial non-mutated version of the software application, compiled from a set of unmodified class files in the application source code 104, into memory associated with the parallel thread. For instance, each of the parallel threads 112 may, based on a WAR file associated with the initial non-mutated version of the software application, load compiled bytecode class files into memory.

However, in these examples, the mutation test manager 102 may also cause individual class files of the application source code 104 to be modified in the parallel threads 112 based on the mutation configurations 108. Compilers 114 associated with each of the parallel threads 112 can then recompile the modified class files. Accordingly, the compilers 114 can be configured to generate an individual application mutant by recompiling a single mutated source code class file into one or more bytecode class files, and by replacing original non-mutant versions of those bytecode class files (already loaded into memory based on the initial non-mutated compiled version of the software application) with the newly compiled bytecode class files.

The mutation test manager 102 may thereby cause the compilers 114 associated with different parallel threads 112 to generate different application mutants 110 by recompiling individual source code class files based on different mutations, and by swapping out previously compiled versions of the class files with the newly recompiled class files in memory. In these examples, the compilers 114 can generate different application mutants 110 more quickly, and/or with the use of fewer computing resources, than recompiling an entire WAR file for each application mutant based on all of the modified and unmodified class files in the application source code 104. By creating different application mutants 110 more quickly, based on recompiling single class files instead of recompiling the full set of class files, test sets 116 can also be executed against the different application mutants 110 in the parallel threads more quickly.

In some examples, the parallel threads 112 and/or corresponding compilers 114 may be executed based on a type of virtual machine that allows single class files to be recompiled, and that allows previously-compiled versions of the class files to be replaced in memory with newly recompiled versions of the class files. For example, although some types of Java® virtual machines may not permit single class recompilation and/or replacement of previously-compiled class files loaded into memory with new recompiled class files during runtime, the parallel threads 112 and/or corresponding compilers 114 may be executed based on a Dynamic Code Evolution Virtual Machine (DCEVM) or other type of virtual machine that does permit hot swapping and/or redefinition of classes loaded into memory at runtime.

As discussed above, the mutation test manager 102 can cause test sets 116, including some or all of the test cases 106, to execute against the application mutants 110 in the parallel threads 112. In some examples, a test set can be executed in sequence against a particular application mutant within a parallel thread. For instance, compiler 114A can generate application mutant 110A in parallel thread 112A, and test cases 106 of test set 116A can then be executed in sequence in parallel thread 112A against application mutant 110A.

However, in other examples, execution of test sets 116 against individual application mutants 110 can also be parallelized. For instance, compiler 114A may generate application mutant 110A in parallel thread 112A as discussed above. However, the parallel thread 112A may include, or be associated with, a group of parallel threads. Accordingly, rather than executing all of the test cases 106 of test set 116A against application mutant 110A in sequence, the mutation test manager 102, or a test manager associated with parallel thread 112A, may distribute the test cases 106 of test set 116A among the group of parallel threads associated with parallel thread 112A. The group of parallel threads associated with parallel thread 112A can then execute test cases 106 of test set 116A concurrently against instances of application mutant 110A. For example, the test cases 106 of test set 116A can be allocated among five parallel threads, such that five different subsets of test set 116A can execute concurrently against instances of application mutant 110A. Executing test sets 116 in parallel with respect to individual application mutants 110 can further decrease mutation testing times, and/or further reduce overall usage of computing resources during mutation testing.

As each of the parallel threads 112 executes test cases 106 of test sets 116 against application mutants, individually or in parallel with respect to each application mutant associated with each of the parallel threads 112, the parallel threads 112 may generate and store corresponding mutation test results 118. For example, different parallel threads may each generate one or more different mutation test results 118, such as mutation test results 118A, 118B, . . . 118N, etc. shown in FIG. 1. Each individual mutation test result may correspond to an individual application mutant, or be an aggregate report associated with all of the application mutant generated based on different modifications to the same class file and/or class file package.

The mutation test results 118 may indicate various testing metrics associated with each application mutant, class file, and/or class file package. For example, mutation test results 118 may indicate a percentage of source code lines of each class that are covered by test cases 106, a total number of application mutants 110 associated with each class file, a number of application mutants 110 that have been tested in the parallel thread, a number and/or percentage of those application mutants 110 that were "killed" based on the test sets 116 executed against those application mutants 110 in the parallel thread, mutation testing times associated with the parallel thread, and/or other mutation testing metrics associated with the parallel thread. The mutation test results 118 may also indicate mutation testing times, mutation testing durations, CPU and/or memory utilization metrics associated with the mutation testing, runtimes associated with modification operations, compilation operations, testing operations, reporting operations, and/or other individual operations associated with the mutation testing, and/or other metrics. In some examples, the mutation test results 118 may also filter, sort, or categorize application mutants 110 by substitution type, products or classes associated with the application mutants 110, programmers or programming teams associated with the class files, times that the application mutants 110 were created and tested, and/or via any other criteria.

Figure 3:
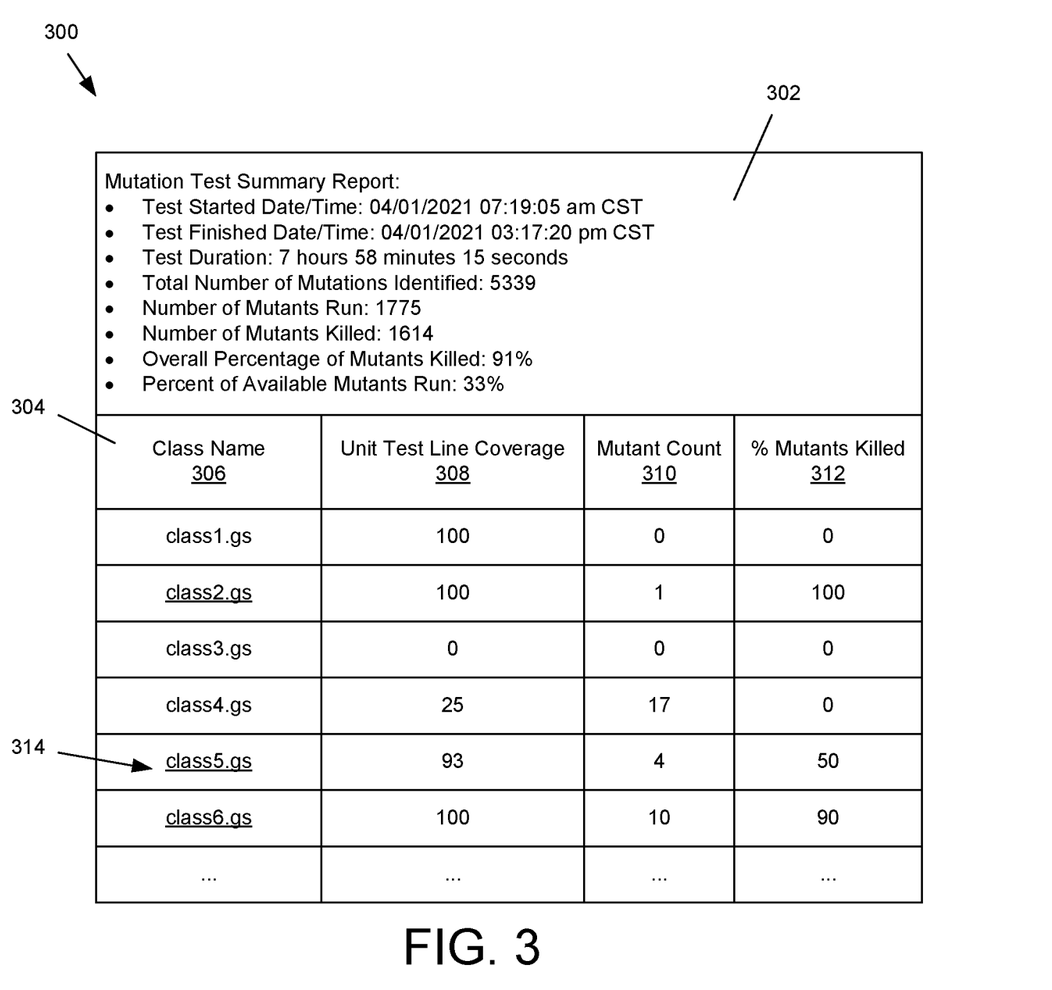
FIG. 3 shows an example of an aggregated test result report associated with mutation testing.
Figure 4:
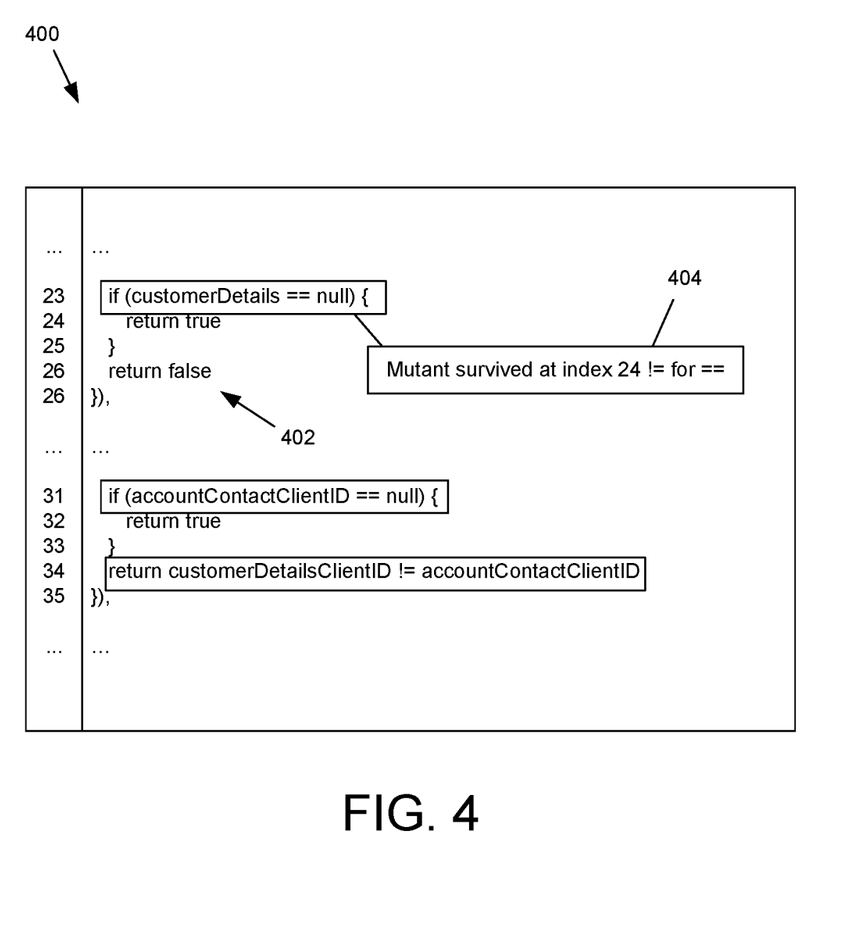
FIG. 4 shows an example of source code of a class file that has been modified to create an application mutant for mutation testing.

The mutation test manager 102 can receive the mutation test results 118 associated with each of the parallel threads 112, and can compile or aggregate the mutation test results 118 into an aggregated test result report 120. The aggregated test result report 120 can be a report, an email or other electronic notification, a dashboard or user interface presentation, or any other type of data that indicates overall mutation testing metrics. Examples of the aggregated test result report 120 are shown in FIGS. 3 and 4, and are discussed further below with respect to those figures.

In some examples, the mutation test manager 102 can create a directory structure in memory that includes subdirectories for each class file or package of class files, in the application source code 104. As each of the parallel threads 112 executes test cases 106 against application mutants 110 generated based on modifications to class files, each of the parallel threads 112 can store mutation test results 118 into a corresponding subdirectory. The mutation test manager 102 may then traverse the subdirectories to obtain the individual mutation test results 118 produced by the different parallel threads 112 for different application mutants 110, and create the aggregated test result report 120 by combining, averaging, or otherwise aggregating metrics included in the individual mutation test results 118.

For example, the aggregated test result report 120 may for each class file package and/or overall, indicate a total number of application mutants 110 tested, a total number of application mutants 110 that were killed, a total number application mutants 110 that survived, source code line numbers that correspond to application mutants 110 that were killed or survived, percentages of classes associated with application mutants 110 that were killed or survived, percentages of class files that could have been modified according to mutation configurations 108 to create application mutants 110 (whether or not they were modified during the mutation testing), counts and/or percentages of survived and killed application mutants associated with specific programing teams or products, average times to execute the application mutants 110, an average number of application mutants 110 per class, aggregated memory and/or CPU utilization metrics, a total mutation testing runtime, total runtimes for individual operation types such as modification operations, compilation operations, testing operations, reporting operations, or other individual operations, and/or any other type of aggregated metric associated with mutation testing across multiple parallel threads 112.

In some examples, the mutation test manager 102 may also be configured to transmit an alert to a designed recipient, or perform another type of automated action, if a value in the aggregated test result report 120 reaches a predefined value, or otherwise meets predefined conditions. For example, if the mutation test manager 102 is configured to perform the mutation testing described herein before merge requests can be submitted to integrate new code changes to the application source code 104, an asynchronous or synchronous task can be initiated to monitor the aggregated test result report 120 and verify that an overall percentage of killed application mutants exceeds 80%, or some other threshold percentage, before new merge requests are permitted. If the aggregated test result report 120 indicates, for example, that less than 80% of the tested application mutants 110 were killed by the current test cases 106, the mutation test manager 102 may thus output an alert and/or prevent new merge requests from being accepted until the suite of test cases 106 is changed to kill at least 80% of tested application mutants 110.

Overall, by modifying class files within each of the parallel threads 112, recompiling those modified class files in the parallel threads 112 to generate different application mutants 110, and executing test cases 106 against different application mutants 110 in different parallel threads 112 concurrently, overall mutation testing times can be significantly reduced relative to compiling and testing each application mutant sequentially. Recompiling individual modified class files into bytecode and replacing previously compiled bytecode with the new recompiled class files, instead of recompiling the entire software application after the source code modification, can also reduce overall mutation testing times.

For instance, sequentially compiling each of hundreds or thousands of application mutants 110 in full (based on changed and unchanged source code class files) and executing a full suite of hundreds or thousands of test cases 106 against each application mutant may, in some examples, take years. However, modifying and recompiling only individual classes to generate different application mutants 110 in different parallel threads 112, and executing test cases 106 against those different application mutants 110 in different parallel threads 112, may in some examples reduce overall mutation testing times from years to days. Additionally, in examples in which different test sets 116 of the test cases 106 can also be executed against individual application mutants 110 in parallel, overall mutation testing times may in some cases be further reduced from days to hours. Accordingly, the systems and processes described herein can significantly reduce overall mutation testing times, and/or reduce the amount of computing resources that are devoted to mutation testing over extended periods of time.

Figure 2:
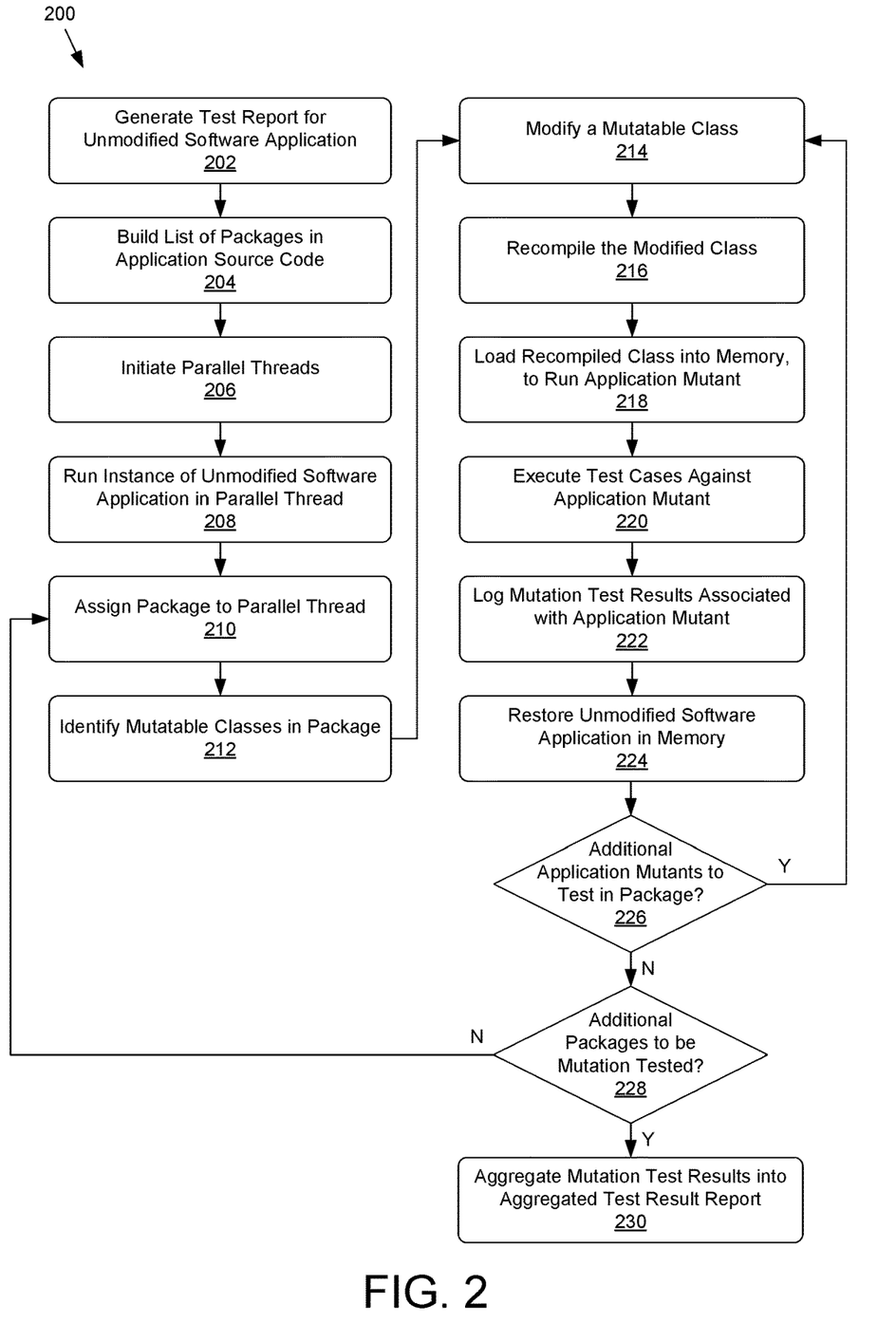
FIG. 2 shows a flowchart of an example process for executing mutation testing via parallel threads.

FIG. 2 shows a flowchart of an example process 200 for executing mutation testing via parallel threads 112. Process 200 may be implemented using one or more computing devices. An example system architecture for such a computing device is described below with respect to FIG. 5.

At block 202, the mutation test manager 102 can generate a test report by executing the test cases 106 against an unmodified version of the software application. In some examples, the mutation test manager 102 can itself execute the test cases 106 against the unmodified software application. In other examples, the mutation test manager 102 can cause another testing tool to execute the test cases 106 against the unmodified software application. The unmodified version of the software application may be based on unmodified application source code 104, such as a version of the application source code 104 retrieved from a master code branch. The unmodified version of the software application may be newly compiled based on an instruction from the mutation test manager 102, or may be a previously compiled instance of the software application.

The test report generated at block 202, based on executing the test cases 106 against the unmodified version of the software application, can indicate code coverage metrics associated with individual class files of the application source code 104. For instance, a Java® Code Coverage (JaCoCo) unit test report, or other type of test report produced at block 202, may include code coverage metrics indicating that 85% of the lines of a first class file are covered by the existing test cases 106, while 60% of the lines of a second class file are covered by the existing test cases 106.

At block 204, the mutation test manager 102 can build a list of class file packages in the application source code 104. The list of class file packages in the application source code 104 may be held in memory in an array, or other type of data structure. In some examples, the mutation test manager 102 can identify class file packages in the application source code 104 based on names or other identifiers of class file packages indicated in the test report produced at block 202.

In some examples, the mutation test manager 102 may also create a directory structure in memory to hold mutation test results 118 associated with each of the class file packages, and/or create a hash map to hold mutation testing metadata associated with corresponding application mutants 110.

At block 206, the mutation test manager 102 can initiate a group of parallel threads 112. As a non-limiting example, the mutation test manager 102 may spin up ten different parallel threads 112 on one or more computing devices. For instance, in some examples the mutation test manager 102 can use a Java® concurrent "ExecutorService" to initialize a number of parallel threads 112 in a thread pool. In some examples, the mutation test manager 102 may determine computing resources available on one or more computing devices configured to perform mutation testing, and may base the number of parallel threads 112 at least in part on the available computing resources.

At block 208, the mutation test manager 102 may cause each of the parallel threads 112 to load and/or execute the unmodified version of the software application. For example, each of the parallel threads 112 may load and execute a different instance of the unmodified software application tested at block 202.

At block 210, the mutation test manager 102 can assign a class file package, from the list generated at block 204, to a parallel thread. Different class file packages can be assigned to different parallel threads 112 at block 206. Each parallel thread 112 can, as discussed below, execute block 212 through block 228 for each class file package assigned to that parallel thread. For example, one parallel thread can execute block 212 through block 228 for a first class file package, while a second parallel thread can, substantially concurrently, execute block 212 through block 228 for a second class file package.

In some examples, the mutation test manager 102 can create Java® Future objects for each of the class file packages identified at block 204. In these examples, when a parallel thread completes execution of block 212 through block 228 for one class file package, a Java® Future object for the next unprocessed class file package can cause that parallel thread to begin executing block 212 through block 228 for the next unprocessed class file package. Accordingly, when a parallel thread becomes available, the parallel thread can being be assigned to process the next available unprocessed class file package in the list built at block 204.

At block 212, the mutation test manager 102 can cause a parallel thread associated with a class file package to identify mutatable classes within the class file package. For example, the mutation test manager 102 can initiate execution of a script within each of the parallel threads 112 that is configured to identify mutatable classes within class file packages assigned to the parallel threads 112. In some examples, a mutatable class may be a class that includes one or more source code lines that correspond to at least one of the mutation configurations 108. In other examples, a mutatable class may be a class with source code lines that correspond with a mutation configuration, and that also has a least a threshold percentage of those source code lines covered by the test cases 106. The threshold percentage can be set at 70%, 80%, 90%, or any other predefined percentage.

For example, a script may cause a parallel thread to determine if each class in a class file package includes one or more source code lines that can be modified according to the mutation configurations 108 in order to create an application mutant. If a class does not include source code lines that correspond to a mutation configuration, the script may determine that class is not a mutatable class at block 212. If a class does include one or more source code lines that could be modified according to the mutation configurations 108, the script may determine whether the test report generated at block 202 indicates that at least a threshold percentage of the source code lines of the class are covered by the test cases 106. For instance, if the threshold percentage is 80%, and a first class could be modified in one or more ways according to the mutation configurations 108, but only 50% of the source code lines of the first class are covered by the test cases 106, the script may determine that class is not a mutatable class at block 212. However, if a second class could also be modified in one or more ways according to the mutation configurations 108, and 90% of the source code lines of the second class are covered by the test cases 106, the script may determine that class is a mutatable class at block 212.

At block 214, the mutation test manager 102 can cause the parallel thread to modify a mutatable class identified at block 212, based on a mutation configuration. For example, the script associated with the mutation test manager 102 can execute in the parallel thread, and cause the parallel thread to modify a source code line of the class according to a corresponding mutation configuration. As a non-limiting example, the script may change an "<" operator to an ">" operator in a source line of the class based on a mutation confirmation. In some examples, the parallel thread may also be configured to back up original source code of the class prior to the modification.

At block 216, the mutation test manager 102 can cause the parallel thread to recompile the class modified at block 214. For example, the script associated with the mutation test manager 102 can execute in the parallel thread, and cause one of the compilers 114 associated with the parallel thread to recompile the modified class into one or more bytecode class files. In some examples, if the modification of the class at block 214 leads to errors that prevent compilation, the compilation error can be logged in mutation test results or another error log that identifies the class and the modified source code lines. In these cases, such error logs can be later reviewed by a developer or administrator. Additionally, mutation testing associated with the modified but uncompilable class can be skipped overall or marked as failed in mutation test results, and the mutation test manager 102 may return to block 214 to modify the same class in a different way or to modify a different mutatable class. However, if no compilation errors occur at block 216, the mutation test manager 102 may proceed to block 218.

At block 218, the mutation test manager 102 can cause the parallel thread to load the one or more recompiled class files, such as compiled bytecode class files generated at block 216, into memory associated with the instance of the software application initiated at block 208. The instance of the software application initiated at block 208 may be based on a WAR file or other file that includes original versions of the class files that are recompiled at block 216. However, the parallel thread may replace the original versions of those class files, already in memory, with the recompiled versions of those class files created at block 216 based on the modifications made at block 216. For example, the script associated with the mutation test manager 102 can replace original versions of bytecode class files from an original WAR file with recompiled versions of those bytecode class files generated at block 216. In some examples, the parallel thread may back up the original versions of the class files for later restoration. Loading the one or more recompiled class files into memory, along with other class files from the instance of the software application initiated at block 208, can cause an application mutant to execute in the parallel thread.

At block 220, the mutation test manager 102 can initiate execution of at least some of the test cases 106 against the application mutant. For example, the script associated with the mutation test manager 102 can execute in the parallel thread, and cause one or more test sets 116 that include some or all of the test cases 106 to execute against the application mutant 110.

In some examples, all of the test cases 106 can execute in association with the application mutant. In other examples, a subset of the test cases 106 can execute in association with the application mutant, such as a test set that includes test cases 106 specifically associated with the modified class, or that are specifically associated with the lines of code that were changed in the modified class. For example, the mutation test manager 102, a separate unit and/or integration test manager, a configuration file, a script, or other element may identify specific test cases 106 associated with the application mutant. For instance, test cases 106 may include annotations that indicate test topics or application functionalities that the test cases 106 are intended to test. A test manager may use such annotations in test cases 106, and/or similar annotations in the source code of the modified class, to identify a subset of test cases 106 that are designed to test functionality implemented by the modified class and/or specific modified lines of source code in the modified class. The test manager may accordingly cause the subset of test cases 106 to execute against the application mutant generated based on the modified class.

In some examples, the parallel thread may execute the test cases 106 in sequence against the application mutant. In other examples, the parallel thread may spawn, or already be associated with, a group of parallel threads. In these examples, each of those parallel threads may initiate a separate instance of the application mutant, and each parallel thread may execute a different test set against the application mutant. Accordingly, execution of the test cases 106 against a particular application mutant may be parallelized at block 220.

At block 222, the mutation test manager 102 can cause the parallel thread to log mutation test results 118 associated with the application mutant and/or the class file package. For example, as noted above, at block 204 the mutation test manager 102 may have created a directory structure based on the list of class file packages. Accordingly, at block 222, mutation test results 118 indicating metrics associated with test cases 106 executed against the application mutant at block 220 can be added to a folder or other directory location associated with the current class file package. For example, the mutation test results 118 may indicate whether test cases 106 executed at block 220 failed, and thus killed the application mutant, or succeeded and did not kill the application mutant. If mutation test results 118 are already stored in memory based on one or more other application mutants associated with the current class file package, new test results can be added to the existing mutation test results 118 associated with the current class file package.

At block 224, the mutation test manager 102 can cause the parallel thread to restore the unmodified software application in memory. For example, the mutation test manager 102 can cause any original bytecode class files that had been replaced by recompiled versions at 218, to be restored in memory from a backup or be recompiled from backed up original source code.

At block 226, the mutation test manager 102 can cause the parallel thread to determine if any other application mutants 110 could be tested in association with the current class file package. For example, the parallel thread may determine that at least one additional application mutant could be tested if the current class file could be modified in a different way according to a different mutation configuration at block 214, or if other mutatable classes were identified in the package at block 212 that could be modified according to one or more mutations configurations 108. If another application mutant associated with the current class file package could be tested, the parallel thread may repeat blocks 214 through 224 for each additional application mutant.

Once the parallel thread has used blocks 214 through 224 to create application mutants based on each identified mutatable class in a class file package, and to execute test cases 106 against those application mutants, the mutation test manager 102 may determine at block 228 whether any additional class file packages can be mutation tested. For example, if there are fifty class file packages and ten parallel threads 112, a first ten of the class file packages can be processed substantially concurrently by the ten different parallel threads 112. When one of the parallel threads finishes processing a class file package, the next class file package out of the fifty class file packages can be assigned to that parallel thread at block 210, such that the parallel thread can repeat blocks 212 through 226 for the next class file package. As discussed above, the mutation test manager may have created a Java® Future object for each class file package, such that the next Java® Future object is called when a parallel thread becomes available to process the corresponding class file package.

At block 230, the mutation test manager 102 can aggregate the mutation test results 118 into the aggregated test result report 120. For example, the mutation test manager 102 can retrieve mutation test results 118 associated with each of the application mutants 110 and/or class file packages, and aggregate the mutation test results 118 into the single aggregated test result report 120. Although application mutants 110 associated with different class file packages may have been tested in different parallel threads, the mutation test manager 102 may combine the different corresponding mutation test results 118 into the aggregated test result report 120 that indicates metrics associated with mutation testing of all the application mutants 110. The mutation test manager 102 may output the aggregated test result report 120 as a report, display the aggregated test result report 120 via a dashboard or other user interface, or otherwise generate and/or display the aggregated test result report 120 in a human-readable form, as shown and described below with respect to FIG. 4 and FIG. 5.

FIG. 3 shows an example 300 of an aggregated test result report 120 associated with mutation testing. The aggregated test result report 120 can include a summary section 302 and a detail section 304. The aggregated test result report 120 can be displayed in a dashboard or other user interface, as a downloadable report, as an email or other electronic notification, or any other type of user-viewable data.

The summary section 302 can indicate overall metrics associated with mutation testing performed by the mutation test manager 102. For example, the summary section 302 may indicate dates and/or times when the mutation testing started and finished, and/or a corresponding test duration.

The summary section 302 may also indicate a total number of application mutants 110 that were identified, and a number of application mutants 110 that were actually tested using multiple parallel threads 112. The summary section 302 may also indicate a percentage of the total number of identified application mutants 110 that were executed during the mutation testing. The total number of application mutants 110 that were identified may be based on how many application mutants 110 could have been created and tested by modifying class files based on mutation configurations 108. For instance, if the mutation test manager 102 identified twenty class files in the application source code 104 that included source code lines that matched mutation configurations 108, and each of those twenty class files could have been modified in five different ways according to the mutation configurations 108, it may have been possible to create and test one hundred application mutants 110. However, the mutation test manager 102 may have only tested thirty of those one hundred possible application mutants 110. For instance, if the test cases 106 only covered 80% or more of the source code lines in six of the twenty class files, the mutation test manager 102 may have determined that only those six class files were mutatable, and may have only generated and tested thirty application mutants 110 based on those six mutatable class files.

As another example, as shown in FIG. 3, the mutation test manager 102 may have identified 5339 possible application mutants 110, but only generated and tested 1775 of those application mutants 110 based on source code lines in corresponding class files being at least 80% covered by test cases 106. The summary section 302 may indicate the numbers of identified and executed application mutants 110, and indicate that 33% of the identified application mutants 110 were actually executed during the mutation testing.

The summary section 302 may also indicate a number of application mutants 110 that were "killed" by the test cases 106, out of the number of application mutants 110 that were actually executed during the mutation testing. The summary section 302 may further indicate a percentage of the executed application mutants 110 that were "killed" during the mutation testing. For instance, as shown in FIG. 3, the summary section 302 can indicate that, out of the 1775 application mutants 110 that were run during the mutation testing, 1614 application mutants 110 (91% of the 1775 executed application mutants 110) were "killed" by the test cases 106.

The detail section 304 can indicate metrics specific to individual class files in the application source code 104. For example, the detail section 304 can include a class name column 306, a unit test line coverage column 308, a mutant count column 310, and a percentage of mutants killed column 312. The class name column 306 can include a list of names or filenames of individual class files in the application source code 104. In some examples, the individual class files listed in the class name column 306 of the aggregated test result report 120 may have been processed in the different parallel threads 112 during the mutation testing. The unit test line coverage column 308 can indicate percentages of source code lines in class files that are covered by test cases 106, for instance based on the JaCoCo unit test report discussed above with respect to FIG. 2. The mutant count column 310 can indicate how many application mutants 110 could be generated by modifying each of the corresponding class file according to the mutation configurations 108. The percentage of mutants killed column 312 can indicate percentages of application mutants 110, generated and executed based on modifications to the corresponding class files, were killed during the mutation testing.

As discussed above, in some examples application mutants 110 associated with modifications to specific class files can be generated and tested if at least a threshold percentage of source code lines in the class files are covered by test cases 106, and if the source code lines in the class files can be modified in one or more ways based on mutation configurations 108. Accordingly, the detail section 304 may indicate that application mutants 110 based on modifications to specific class files were tested during the mutation testing if values in the unit test line coverage column 308 are at least 80%, or another threshold percentage, and if values in the mutant count column 310 are greater than zero.

For example, some class files may have at least the threshold percentage of source code lines covered by test cases 106, but not have source code lines that can be modified according to mutation configurations 108. Accordingly, such class files may not be specifically associated with application mutants 110 tested during the mutation testing. For instance, 100% of the source code lines in the "class1.gs" class file may be covered by test cases 106, but the mutation configurations 108 may indicate that zero application mutants 110 could be created by modifying the "class1.gs" class file. Accordingly, the detail section 304 may indicate that zero application mutants 110 associated with modifications to the "class1.gs" class file were tested during mutation testing.

Other class files may have less than the threshold percentage of source code lines covered by test cases 106. In some examples, the mutation test manager 102 may be configured not to mutation test application mutants 110 associated with modifications to such class files. For instance, although the mutation configurations 108 may indicate that 17 different application mutants 110 could be created by modifying the "class4.gs" class file, the mutation test manager 102 may nevertheless determine not to create or test those 17 application mutants 110 because only 25% of the source code lines in the "class4.gs" class file are covered by test cases 106. Still other class files, such as the "class3.gs" class file, may have less than the threshold percentage of source code lines covered by test cases 106, and be associated with zero possible application mutants 110. Accordingly, the mutation test manager 102 may nevertheless determine not to create or test application mutants 110 based on such class files.

However, if class files have both at least the threshold percentage of source code lines covered by test cases 106, and have one or more source code lines that can be modified according to mutation configurations 108, the mutation test manager 102 may determine to create and test application mutants 110 based on such class files. For example, in FIG. 3, the "class2.gs" class file, the "class5.gs" class file, and the "class6.gs" class file each have source code lines that are at least 80% covered by test cases 106, and could spawn one or more application mutants 110 based on modifications to the class files according to the mutation configurations 108. Accordingly, the mutation test manager 102 may determine to create and test application mutants 110 based on these class files, for instance via parallel threads 112 as discussed above.

In some examples, lines and/or fields in the detail section 304 may be color coded, or otherwise marked, based on the values in such lines and/or fields. For example, values in the unit test line coverage column 308 may be shaded green if the line coverage meets or exceeds 80%, or another threshold percentage, or be shaded gray if the line coverage is lower than the threshold percentage. Similarly, values in the percentage of mutants killed column 312 may be shaded gray if zero application mutants 110 associated with the class file were tested, or be shaded green if at least one associated application mutant was tested and the percentage of those application mutants 110 "killed" by the test cases 106 meets or exceeds 80% or another threshold value. However, the values in the percentage of mutants killed column 312 may be also shaded red if at least one application mutant associated with the class file was tested but the percentage of those application mutants 110 that were "killed" by the test cases 106 is lower than the threshold value. For example, in the line for the "class5.gs" class file, the value in the percentage of mutants killed column 312 may be shaded red because only 50% of the application mutants 110, corresponding to modifications of the "class5.gs" class file, were killed by the test cases 106.

In some examples, if one or more application mutants 110 associated with class files were tested during the mutation testing, the corresponding class file names can be displayed as hyperlinks 314 or other selectable links in the class name column 306. A user selection of such a class file name can cause the source code of the class file to be displayed, as shown in the example of FIG. 4 discussed below. Accordingly, a user can view the aggregated test result report 120 to identify which class files are not sufficiently covered by test cases 106, which class files are sufficiently covered by test cases 106, how many application mutants 110 were generated and tested based on modifications to different class files, and how many of those application mutants 110 were killed by the test cases 106. The user may also be able to select class file names to view the source code of the selected class files and/or other information about the mutation testing associated with the selected class files, as discussed below with respect to FIG. 4.

FIG. 4 shows an example 400 of source code 402 of a class file that has been modified to create an application mutant for mutation testing. In some examples, the source code 402 can be displayed in a dashboard, text editor, integrated development environment (IDE), or other user interface based on a user selection of the class file via the aggregated test result report 120. The source code 402 can be displayed in a marked-up form to indicate application mutants 110 that were tested based on modifications to the source code 402. Accordingly, a user may be able to view the source code 402 to determine which lines of source code 402 were modified during mutation testing, and/or determine which mutations were killed, or were not, killed by test cases 106.

Lines of source code 402 that were modified according to mutation configurations 108 may be highlighted or otherwise marked. In some examples, the marking of the source code lines may be color-coded, or have other information, to indicate whether corresponding application mutants were killed by test cases 106. For instance, source code line 23 in FIG. 4 may be highlighted red to indicate that one or more application mutants 110, created by modifying source code line 23, were not killed by the test cases 106. As another example, source code lines 31 and 34 may be highlighted green in FIG. 4 to indicate that application mutants 110, created by modifying source code lines 31 and 34, were killed by the test cases 106. In still other examples, a source code line may be highlighted yellow to indicate that one or more application mutants 110 generated by modifying the source code line were not killed by the test cases 106, but one or more other application mutants 110 generated by modifying the source code line in were killed by the test cases 106.

In some examples, a user may hover a mouse-controlled pointer over a line of source code, or otherwise select a line of source code, to display more information about application mutants 110 associated with the selected line of source code. For example, selecting highlighted line 23 in example 400 may prompt display of a pop-up message 404 indicating that an application mutant was generated during the mutation testing by replacing the "==" operator with a "!=" operator, and that that application mutant was not killed by any test cases 106 during the mutation testing. The information displayed in the pop-up message 404 may indicate to a user that the user should revise the test cases 106, or create a new test case, to more specifically test for errors corresponding to the application mutant that survived the current test cases 106.

Figure 5:
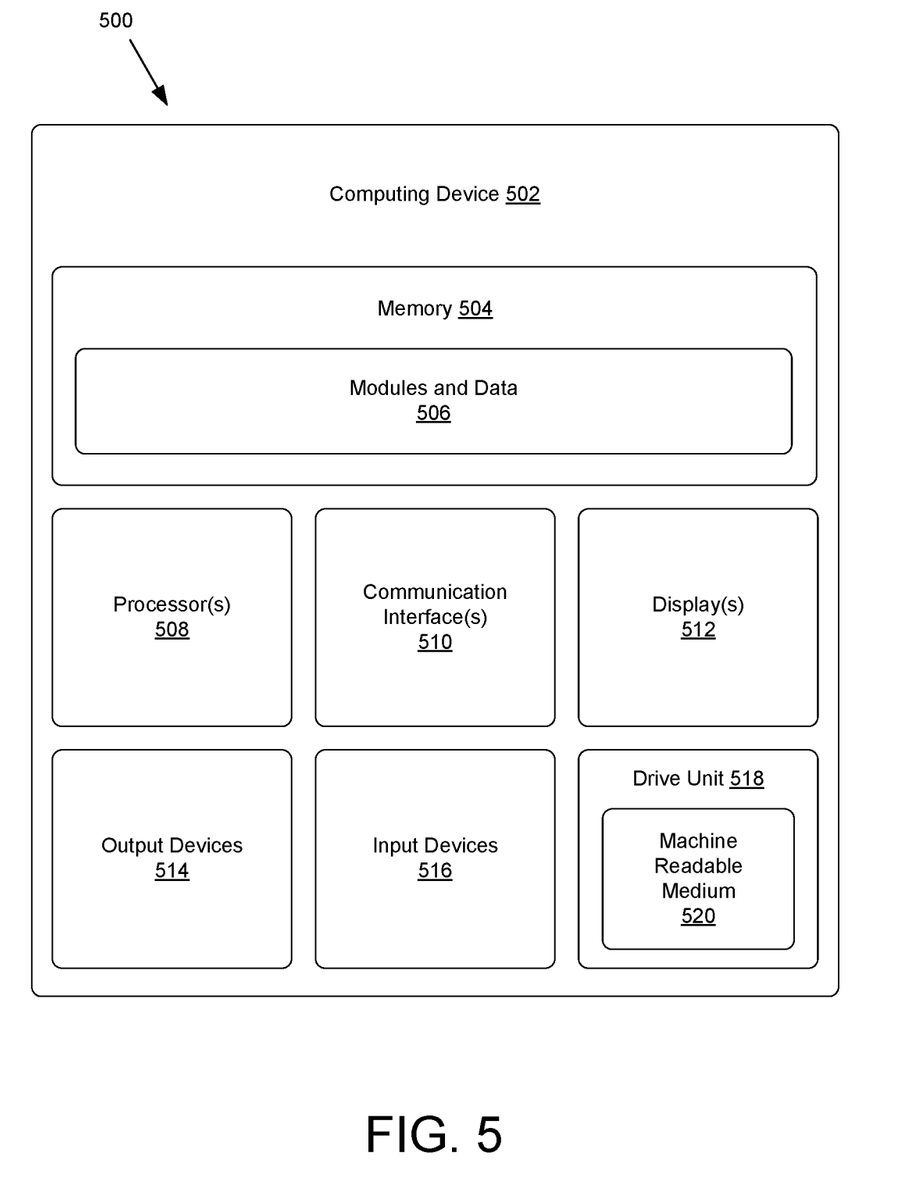
FIG. 5 shows an example system architecture for a computing device.

FIG. 5 shows an example system architecture 500 for a computing device 502 associated with the software testing system 100 described herein. The computing device 502 can be a server, computer, or other type of computing device that executes one or more portions of the software testing system 100, such as a computing device that executes the mutation test manager 102 and/or that executes test cases 106 against application mutants in parallel threads 112. In some examples, elements of the software testing system 100 can be distributed among, and/or be executed by, multiple computing devices. For instance, elements of the mutation test manager 102 can be executed by one or more computing devices, the parallel threads 112 can be spun up on one or more other computing devices.

The computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 502. Any such non-transitory computer-readable media may be part of the computing device 502.

The memory 504 can store modules and data 506. The modules and data 506 can include data associated with the mutation test manager 102, the application source code 104, the test cases 106, the mutation configurations 108, the parallel threads 112, the aggregated test result report 120, and/or other data. The modules and data 506 can also include any other modules and/or data that can be utilized by the computing device 502 to perform or enable performing any other actions. Such other modules and data can include a platform, operating system, and applications, and data utilized by the platform, operating system, and applications.

As discussed above, the mutation test manager 102 may cause portions of the memory 504 to be allocated to different parallel threads 112. For instance, the mutation test manager 102 may allocate portions of an overall amount of the memory 504 to different parallel threads 112, and cause different application mutants 110 to be generated, executed, and tested in the different parallel threads 112.

The computing device 502 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen, and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing device 502. The memory 504 and the processor(s) 508 also can constitute machine readable media 520.

Overall, the systems and methods described herein can allow mutation testing to be performed for software applications coded using programming languages such as Gosu® or Scala that may compile single source code class files into multiple bytecode class files. Instead of making changes to the bytecode class files after compilation, which in some examples may not correspond to changes in the original source code class files, to create application mutants 110, the systems and methods described herein can generate application mutants 110 by modifying source code class files and then recompiling the modified source code class files into bytecode. In some examples, the systems and methods described herein may recompile only the modified source code files into bytecode, and replace previously compiled bytecode present in memory with the newly recompiled bytecode, instead of recompiling the entire software application based on all changed and unchanged source code class files. Accordingly, application mutants 110 may be generated based on changes to source code files that are reflected in corresponding compiled bytecode files, even if the source code is written in a programming language such as Gosu® or Scala that may lead to single source code files being compiled into multiple bytecode files.

Moreover, the systems and methods described herein can reduce mutation testing times by generating different application mutants 110 in different parallel threads 112, and by executing test cases 106 against the application mutants 110 in the different parallel threads 112. Different parallel threads 112 may accordingly perform mutation testing operations for different application mutants 110 concurrently, such that the overall mutation testing can be completed more quickly, and/or with the use of fewer computing resources, relative to performing mutation testing operations for multiple application mutants 110 in sequence. In some examples, different test cases 106 may also be executed against individual application mutants 110 in parallel, further reducing the duration of the overall mutation testing process. Additionally, although different application mutants 110 may be tested in different parallel threads 112, the systems and methods described herein can produce the aggregated test result report 120 so that a user can review information associated with the overall mutation testing of the software application and/or information associated with individual class files in the application source code 104.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
    identifying, by one or more processors, mutatable source code class files associated with a software application;
    generating, by the one or more processors, mutated source code class files by modifying the mutatable source code class files based on at least one mutation configuration;
    compiling, by the one or more processors, the mutated source code class files into compiled bytecode class files that have a different structure than an original structure of the mutated source code class files;
    generating, by the one or more processors, application mutants by swapping first previously-compiled bytecode files with one or more of the compiled bytecode class files in memory, without recompiling additional second previously-compiled bytecode files; and
    executing, by the one or more processors, and in parallel, test cases against the application mutants.

2. The computer-implemented method of claim 1, wherein:
    the original structure of the mutated source code class files is characterized by a first number of files, and
    the different structure of the compiled bytecode class files is characterized by a second number of files that is different from the first number of files.

3. The computer-implemented method of claim 1, wherein:
    the original structure of the mutated source code class files is characterized by a first number of classes, and
    the different structure of the compiled bytecode class files is characterized by a second number of classes that is different from the first number of classes.

4. The computer-implemented method of claim 1, wherein instances of at least one of generating the mutated source code class files or compiling the mutated source code class files are performed in parallel.

5. The computer-implemented method of claim 1, wherein executing the test cases against the application mutants comprises executing, in parallel, the test cases against different application mutants, the different application mutants comprising different sets of the compiled bytecode class files that are characterized by different modifications to the mutatable source code class files.

6. The computer-implemented method of claim 1, wherein executing the test cases against the application mutants comprises executing different sets of test cases, concurrently and in parallel, against a particular application mutant, of the application mutants.

7. The computer-implemented method of claim 1, wherein identifying the mutatable source code class files comprises:
    determining, by the one or more processors, code coverage metrics associated with a plurality of source class files by executing the test cases against an unmodified version of the software application; and
    identifying, by the one or more processors, and based on the code coverage metrics, source class files that have at least a threshold code coverage level and correspond to the at least one mutation configuration.

8. One or more computing devices, comprising:
    one or more processors; and
    first memory storing computer-executable instructions associated with a mutation test manager that, when executed by the one or more processors, cause the one or more processors to:
        generate mutated source code class files by modifying original source code class files, associated with a software application, based on at least one mutation configuration;
        compile the mutated source code class files into compiled bytecode class files that have a different structure than an original structure of the original source code class files;
        generate application mutants by swapping first previously-compiled bytecode files with one or more of the compiled bytecode class files in the first memory or a second memory, without recompiling additional second previously-compiled bytecode files; and
        execute, in parallel, test cases against the application mutants.

9. The one or more computing devices of claim 8, wherein:
    a first mutated source code class file, of the mutated source code class files, comprises a single mutated class, and
    the compiled bytecode class files comprise two or more classes that correspond to the single mutated class.

10. The one or more computing devices of claim 8, wherein the computer-executable instructions cause the one or more processors to perform at least one of generating the mutated source code class files in parallel or compiling the mutated source code class files in parallel.

11. The one or more computing devices of claim 10, wherein different application mutants are generated by swapping different first previously-compiled bytecode files with different compiled bytecode class files.

12. The one or more computing devices of claim 8, wherein:
    the computer-executable instructions cause the one or more processors to:

identify particular source code class files, of a plurality of source code class files, that include at least a threshold percentage of source code lines that are covered by the test cases; and determine that the source code lines of the particular source code class files correspond to the at least one mutation configuration, and the original source code class files, modified based on the at least one mutation configuration, comprise the particular source code class files.

13. One or more non-transitory computer-readable media storing computer-executable instructions that, when executed by one or more processors, cause the one or more processors to:

generate mutated source code class files by modifying original source code class files, associated with a software application, based on at least one mutation configuration;

compile the mutated source code class files into compiled mutated bytecode class files that have a different structure than an original structure of the original source code class files;

generate different application mutants by swapping first sets of previously-compiled bytecode files with different sets of one or more of the compiled mutated bytecode class files, without recompiling other previously-compiled bytecode files; and perform mutation testing by executing, in parallel, test cases against the different application mutants.

14. The one or more non-transitory computer-readable media of claim 13, wherein:

the original structure of the original source code class files is characterized by a first number of files or classes, and the different structure of the compiled mutated bytecode class files is characterized by a second number of files or classes that is different from the first number.

15. The one or more non-transitory computer-readable media of claim 13, wherein the computer-executable instructions cause the one or more processors to perform at least one of generating the mutated source code class files in parallel or compiling the mutated source code class files in parallel.

16. The one or more non-transitory computer-readable media of claim 13, wherein:

the computer-executable instructions cause the one or more processors to:

determine code coverage metrics associated with a plurality of source class files by executing the test cases against an unmodified version of the software application; and identify particular source class files, of the plurality of source code class files, that have, based on the code coverage metrics, at least a threshold code coverage level and correspond to the at least one mutation configuration, and the original source code class files, modified to generate the mutated source code class files, comprise the particular source code class files.

17. A system comprising:

means for identifying mutatable source code class files associated with a software application;

means for generating mutated source code class files by modifying the mutatable source code class files based on at least one mutation configuration;

means for compiling the mutated source code class files into compiled bytecode class files that have a different structure than an original structure of the mutated source code class files;

means for generating application mutants by swapping first previously-compiled bytecode files with one or more of the compiled bytecode class files in memory, without recompiling additional second previously-compiled bytecode files; and means for executing, in parallel, test cases against the application mutants.

18. The computer-implemented method of claim 1, wherein different application mutants are generated by swapping different first previously-compiled bytecode files with different compiled bytecode class files.

19. The one or more computing devices of claim 8, wherein:

the original structure of the original source code class files is characterized by a first number of files, and the different structure of the compiled bytecode class files is characterized by a second number of files that is different from the first number of files.

20. The one or more computing devices of claim 8, wherein:

the original structure of the original source code class files is characterized by a first number of classes, and the different structure of the compiled bytecode class files is characterized by a second number of classes that is different from the first number of classes.

* * * * *